Patented July 18, 1933

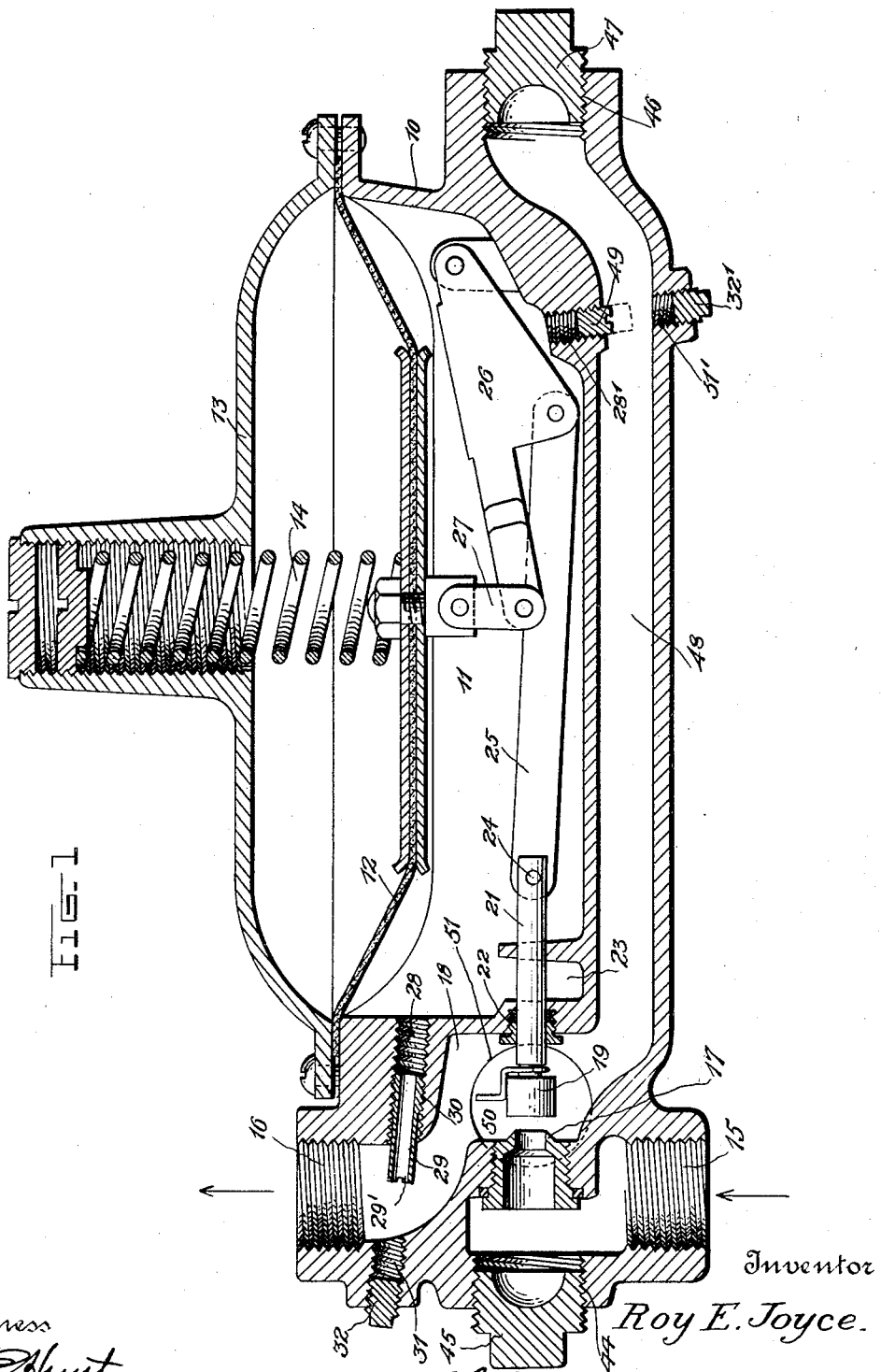

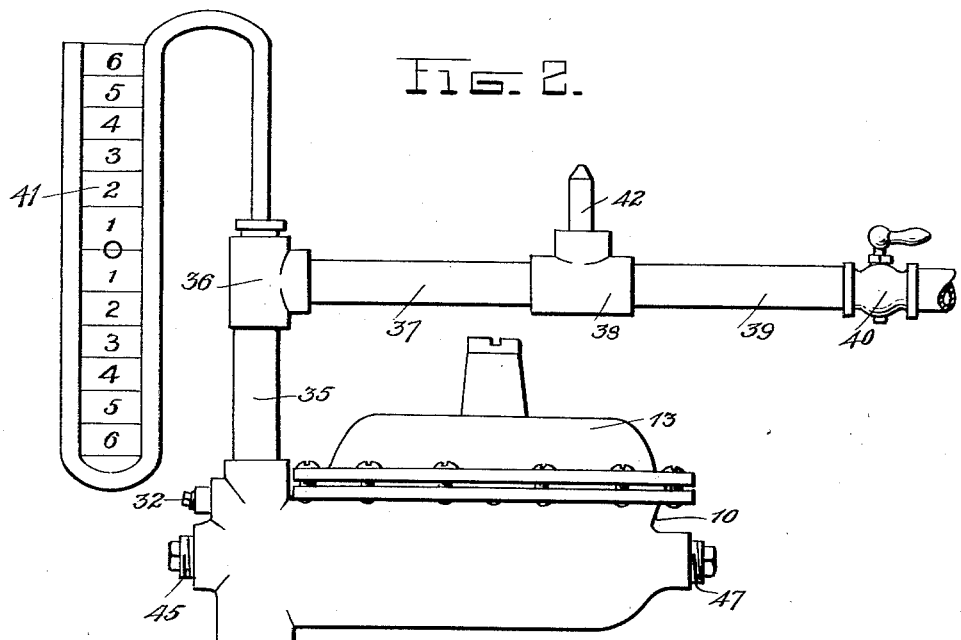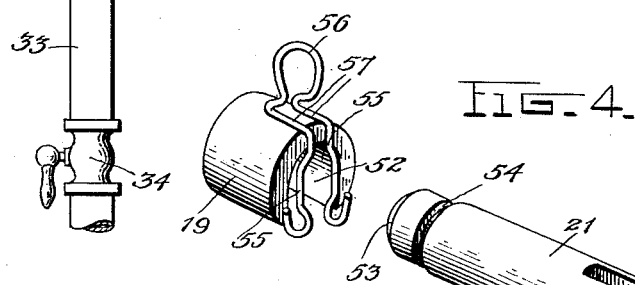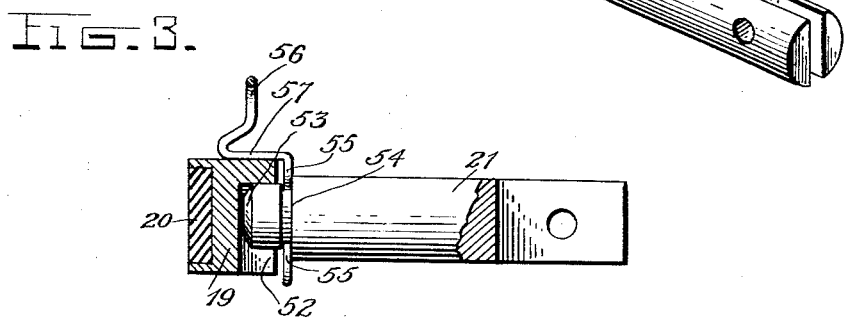

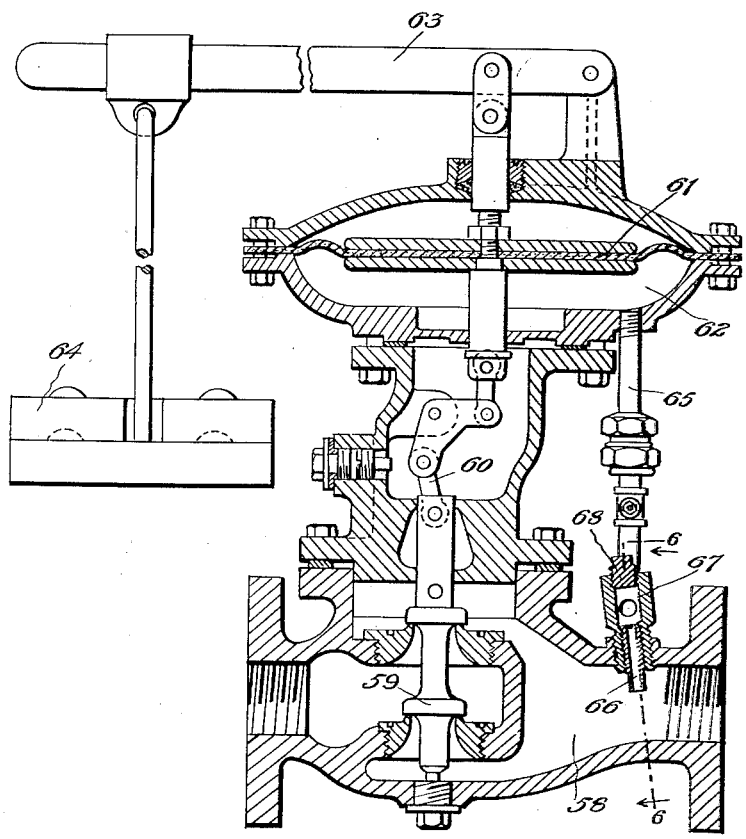
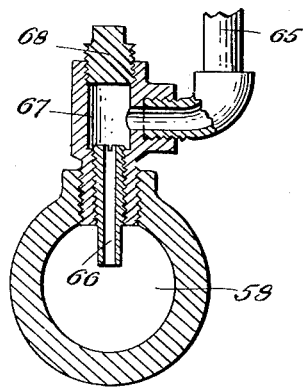

1,918,602

UNITED STATES PATENT OFFICE

ROY E. JOYCE, OF EAST LOS ANGELES, CALIFORNIA

HOUSE SERVICE GAS REGULATOR

Application filed February 28, 1931. Serial No. 519,156.

The invention relates to gas regulators used in house service lines leading from gas mains, for the purpose of regulating the gas pressure passed through said service lines. While such regulators of the types now in use, operate successfully at low flows, they will not steadily pass a sufficient flow to supply maximum demands, even though there be ample gas pressure in the mains. This is due to the fact that the diaphragm or the like of the conventional regulator, against which the gas pressure forces to close the regulator valve, is directly exposed to the expanding gas which has passed said valve, with the result that as soon as the valve opens in an attempt to pass a large flow, the expanding gas acts against the diaphragm or the like and immediately effects total or partial closing of the valve. Hence, the best the regulator can do, is to pass only the volume of gas permitted by this increased pressure against the diaphragm instead of permitting the required large flow to steadily pass through the service line.

It is the object of my invention to overcome this prior difficulty by the provision of novel adjustable means for subjecting the diaphragm or the like to sufficient negative pressure to hold the valve in position for any predetermined high rate of flow regardless of the character of gas used and the structure is such that said valve will remain positioned in direct proportion to the velocity of the flow.

With the foregoing in view, the invention resides in the novel subject matter hereinafter described and claimed, description being accomplished by reference to the accompanying drawings.

Fig. 1 is a vertical longitudinal sectional view through one form of regulator constructed in accordance with my invention.

Fig. 2 is a side elevation showing the apparatus used in setting the regulator to pass the desired flow.

Fig. 3 is an enlarged longitudinal sectional view through the valve head, showing the connection between the latter and the valve stem.

Fig. 4 is a perspective view showing the valve head disconnected from the stem.

Fig. 5 is a vertical sectional view showing a different form of regulator improved in accordance with the present invention.

Fig. 6 is a detail transverse sectional view on line 6—6 of Fig. 5.

The regulator detailed in Fig. 1 is of a type convertible for either horizontal or vertical flow, and for illustrative purposes, it is shown conditioned for vertical flow. The regulator body 10 embodies a control chamber 11 whose top is closed by a diaphragm 12 held in place by an appropriate cap or the like 13, in which an adjustable spring 14 is mounted, said spring exerting a downward pressure upon said diaphragm. At one side of the control chamber 11, the body 10 is provided with a gas inlet 15, with a gas outlet 16, with a valve seat 17 between said inlet and outlet, and with an expansion chamber 18 at the delivery side of said seat. A valve head 19 having a yieldable face 20 is co-operable with the seat 17 and is connected with one end of a valve stem 21. This valve stem passes slidably and fluid-tightly through a guide 22 in the side wall of the control chamber 11, extends across a lubricant chamber 23 and is connected at 24 with a link 25, said link 25 being in turn connected with a lever 26 which is linked to or otherwise connected with the diaphragm 12, as indicated at 27. Downward movement of the diaphragm 12 whether effected by creatiton of negative pressure in the chamber 11, or by the spring 14, effects valve opening, whereas upward movement of said diaphragm effected by accumulation of pressure in the chamber 11, closes the valve.

A restricted passage 28 having a tubular terminal 29 constitutes the sole means of communication between the control chamber 11 and the portion of the flow passage of the regulator beyond the valve seat 17, said tubular terminal 29 projecting in the direction of its length from one longitudinal side of the flow passage toward the opposite longitudinal side of said passage. This terminal 29 is provided with an open outer end 29' disposed in a plane at approximately six degrees to the line of gas flow, and this angular positioning of the open end 29' may be obtained either by obliquely positioning the tubular terminal 29, or by positioning this terminal substantially perpendicular to the line of flow and obliquely cutting its free end. Provision is made for adjusting the tubular terminal 29 transversely of the flow passage so that it projects to any desired extent across said flow passage. In the present showing, part of the side wall of the control chamber 11 forms a side wall of the flow passage and carries the terminal 29, and said terminal and wall are provided with interengaged screw threads 30. To permit access to the terminal 29 for purpose of adjusting it inwardly or outwardly as required, an opening 31 is formed through the wall of the flow passage, in alinement with said terminal, said opening being normally closed however, by a plug or the like 32. When this plug is removed, a screw driver or other suitable tool may be inserted through the opening 31 and used to rotate the tubular terminal 29, to adjust it as required.

At relatively low flows, the regulator operates in the conventional manner. At high flows, however, the gas in flowing across the open end of the tubular terminal 29, creates suction through the passage 28, thereby creating negative pressure in the control chamber 11 and consequently holding the diaphragm 12 in such position that the valve head 19 will remain in its open position. The flow of gas through the flow passage of the regulator varies diametrically of said passage with the velocity of the gas. At low flows, the gas velocity is uniform from the center of the flow passage to its circumference. As the flow increases, the gas spreads toward the circumference of the flow passage, and at large flows, the gas velocity is at its highest point one-fourth of the diameter of the flow passage from its circumference. Further toward the circumference of the passage, the velocity is less due to friction with the wall of the passage, while further toward the center of the passage, the velocity is less, due to inertia. If the tubular terminal 29 be set at one-third the diameter of the flow passage, at a low flow of gas the minus pressure in the passage 28 and the chamber 11 will be very little, but as the flow increases in volume, the velocity increases, and as the gas is crowded toward the surface of the flow passage, the minus pressure in the tubular terminal 29, passage 28 and chamber 11, increases correspondingly, and as the velocity of the gas further increases, the line of flow is crowded further toward the surface of the flow passage until it reaches its maximum at one-fourth the diameter of said passage. At this point, the line of highest velocity is between the open end of the tubular terminal 29 and the surface of the flow passage. As the line of highest velocity crosses the open end 29', of the terminal 29, the latter reaches its highest state of efficiency and hence at that time creates maximum negative pressure in the control chamber 11, holding the diaphragm 12 in valve-open position. It will thus be seen that as the suction passage 28 is dependent for its efficiency, upon directing the high velocity line of flow across the open end 29' of the terminal 29, and as said line of high velocity flow moves toward the periphery of the flow passage as the flow through said passage increases, the regulator may be set to pass any required flow of gas, simply by properly adjusting the tubular terminal 29 diametrically of the flow passage. Hence, by this simple expedient, I am enabled to set the regulator for any desired gas flow. Attention, however, is invited to the fact that the regulator set for properly handling one kind of gas will not properly handle another kind, due to differences in the density of different gases. Propane gas with a gravity of 2, will produce maximum minus pressure in the control chamber 11 at about 500 feet per hour, when the tube 29 projects to one extent across the flow passage; coal gas at a gravity of .50 will produce maximum negative pressure in said control chamber 11 at a velocity of about 1200 feet per hour with tube 29 projecting a different distance across the flow passage, and air with a gravity of 1, will produce said maximum negative pressure at a velocity of about 853 feet per hour, with tube 29 projecting a still different distance across the flow passage, etc. Hence by setting the tube 29 as required, the one regulator may be adjusted to pass any desired maximum flow with any kind of gas. In setting, the equipment shown in Fig. 2 is employed.

An inlet line 33 having a valve 34, is connected with the inlet 15. An outlet nipple 35 is connected with the outlet 16, a T 36 is connected with said nipple 35 and I then add another nipple 37, another T 38, still another nipple 39, and a valve 40. To the T 36, I connect a manometer and to the T 38, I connect an orifice 42. For the conventional regulator tapped for three-fourth inch pipe, the fittings 35, 36, 37, 38, 39 and 40 are all three-fourth inch and the orifice 42 is one-eighth inch. To set the regulator, the following operations should be performed.

With the orifice 42 open, close the valve 40 very slowly after entirely loosening the spring 14. The manometer 41 will now read about two inches water pressure. Now adjust the spring 14 until the manometer 41 indicates the desired pressure, (8 inches for example). Open valve 40 fully and close orifice 42. The manometer 41 will here show a decided drop in pressure, probably from eight inches to four inches. With valve 40 still open, remove plug 32 and adjust tubular terminal 29 until manometer again shows eight inches. Replace plug 32 and the regulator will now deliver gas at a pressure of eight inches over a range of from one-eighth inch opening to that of a three-fourth inch opening. There is a slight leakage around the tool while adjusting the tubular terminal 29, but this leakage added to the tremendous volume discharging through valve 40, has no effect on the adjustment. While I have described the above setting operations with the valve 40 wide open, this was to show setting of the regulator for operation at full capacity, that is, one-thousand cubic feet per hour at eight inches water pressure. However, when setting, the valve 40 may be throttled to any given flow below that aforesaid, and the tubular terminal 29 set to control the pressure.

I have found that the most accurate results are obtainable when the inside area of the tubular terminal 29, is in a proper direct proportion to the area of the diaphragm which it operates. To obtain such proportion, after selecting a diaphragm size necessary to operate the regulator, divide the area of this diaphragm by the constant 1600, and the result will be the necessary area of the tube. For example, if the required area of the diaphragm be 44.179 square inches, the area of the tube would be 44.179 divided by 1600 or .02761 square inches, which is equivalent to three-sixteenths of an inch in diameter.

The length of the terminal 29 should be such that its open end will adjust outwardly to at least one-half of the diameter of the flow passage. The tube with a square-cut end as shown, may be set with said end in a plane at an angle of about six and a half degrees to the line of flow, or said tube may be cut at that angle and the tube set substantially perpendicular to the line of flow, the important thing being that the open end of the tube so face with respect to the gas flow, that the gas at high velocity cannot enter said tube.

The particular form of regulator shown in Fig. 1, in addition to embodying the structure above described, includes a horizontal inlet 44 which is shown closed by plug 45. It also embodies a horizontal outlet 46 in which a plug 47 is shown, and a flow passage 48 extending under the bottom of the chamber 11 and leading from the expansion chamber 18 to said outlet 46. Formed through the bottom of the chamber 11 and communicating with the flow passage 48, is a threaded opening 28' and opposite this opening is an opening 31' closed by a plug 32'. Opening 28' is shown as closed by a plug 49.

When the regulator is to be converted for horizontal instead of vertical flow, the plugs 45 and 47 are removed from the positions shown and threaded into the inlet 15 and the outlet 16. Then too, the tubular terminal 29 is removed from the position shown, the plug 49 is removed, and said parts 29 and 49 are inter-changed so that the suction creating tube 29 may then co-act with the horizontal flow through the regulator in producing the required negative pressure in the chamber 11. The regulator may of course be set for operation at horizontal flow, by the same procedure as above described.

Novel provision is made allowing quick and easy detachment of the valve head 19 from the stem 21 so that a badly worn valve head may be readily removed and another substituted therefor, and the structure is such that these operations may be performed by simply removing a plug 50 from an opening 51 in the regulator body 10, the valve head being accessible through said opening and being removable, simply by pulling it, due to novel structure now to be described.

The rear end of the head 19 is formed with a socket 52 which not only opens through said rear end but opens laterally through the periphery of the head. The socket 52 receives the butt end of the stem 21, which end is preferably somewhat convex as shown at 53, allowing slight movement of the head 19 with respect to the stem to insure proper engagement of the face 20 with the seat 17. Near its front extremity, the stem 21 is provided with a peripheral groove 54, and the head 19 is equipped with two spring arms 55 lying at opposite sides of the socket 52 and disposed at the rear end of said head, in said groove. This construction allows the head 19 to be laterally pulled from the stem 21 and allows a new head to be laterally moved into operative relation with said stem.

In the preferred construction, the arms 55 are formed by the ends of a single length of spring wire. This wire is bent substantially upon itself at its center to provide a loop 56 which projects laterally from the head 19. The two halves of the wire are extended rearwardly from the loop 56 as denoted at 57, and are soldered or otherwise secured upon the head 19, the end portions of the wire being bent inwardly to provide the arms 55 which are receivable in the grooves 54 and yieldably embrace the stem 21. When the plug 50 is removed, the loop 56 may be easily grasped with a pair of pliers or the like, and hence the entire head 19 may be pulled from the stem 21, a new head being placed with equal ease.

In Figs. 5 and 6, a different type of regulator is shown, embodying a flow passage 58 having a valve 59. Operating connections 60 connect this valve with a diaphragm 61 which is pressure-moved in valve-closing direction, the pressure for controlling said diaphragm being contained in a control chamber 62. A lever 63 and weight 64 are shown to move the valve-operating means in valve opening direction. A restricted suction passage 65, having a tubular terminal 66, leads from the chamber 62 to the delivery portion of the flow passage 58. The restricted passage is formed of small piping and pipe fittings, and one of the latter in the nature of a T, is denoted at 67, being threaded into the regulator body. The tubular terminal 66 is threaded into this connection 67 and projects partially across the flow passage 58. A removable plug 68 is provided in one end of the connection 67 giving access to the tubular terminal 66 for adjusting it according to the flow desired.

The form of construction just described operates in substantially the same manner as that first described, for creating negative pressure in the control chamber 62 for the purpose of holding the valve 59 open at high velocity flows.

Excellent results are obtainable from the general structure shown and described and it may therefore be followed if desired. However, within the scope of the invention as claimed, numerous variations may be made.

I claim:—

1. In a gas pressure regulator having a flow passage and a valve therefor; operating means for said valve embodying a suction passage, said suction passage having a tubular suction-creating terminal which projects in the direction of its length from one longitudinal side of the flow passage toward the opposite side of said flow passage, and interengaged screw threads on said tubular terminal and the regulator part which carries it, whereby said terminal may be adjusted transversely of said flow passage to effect projection of said terminal to any desired extent across said flow passage to vary the suction which it will create, said tubular terminal having an open end disposed in a plane at substantially six degrees to the line of flow through said flow passage.

2. In a gas pressure regulator of the type in which pressure in a control chamber regulates a valve to control a flow passage through the regulator; a restricted passage constituting the sole means of communication between said control chamber and said flow passage, said restricted passage having a tubular terminal which projects in the direction of its length from one longitudinal side of the flow passage toward the opposite longitudinal side of said flow passage, said tubular terminal having an open end disposed in a plane at substantially six degrees to the line of flow through said flow passage to cause said tube to create negative pressure in said control chamber at high velocity flows through said flow passage, and means mounting said tubular terminal for adjustment transversely of said flow passage to effect projection of said terminal to any desired extent across said flow passage to vary the negative pressure produced in said control chamber.

3. In a gas pressure regulator of the type in which pressure in a control chamber regulates a valve to control a flow passage through the regulator; a restricted passage constituting the sole means of communication between said control chamber and said flow passage, said restricted passage having a tubular terminal which projects in the direction of its length from one longitudinal side of the flow passage toward the opposite longitudinal side of said flow passage, said tubular terminal having an open end disposed in a plane at substantially six degrees to the line of flow through said flow passage to cause said tube to create negative pressure in said control chamber at high velocity flows through said flow passage, and interengaged screw threads on said tubular terminal and the regulator part which carries it, whereby rotation of said terminal will cause its adjustment transversely of said flow passage to effect projection of said terminal to any desired extent across the flow passage to vary the negative pressure produced in said control chamber.

ROY E. JOYCE.